of a wheel supported cultivator, of which cross bars 12 and 13 are shown and supporting wheels 14, the latter preferably being rubber tired.

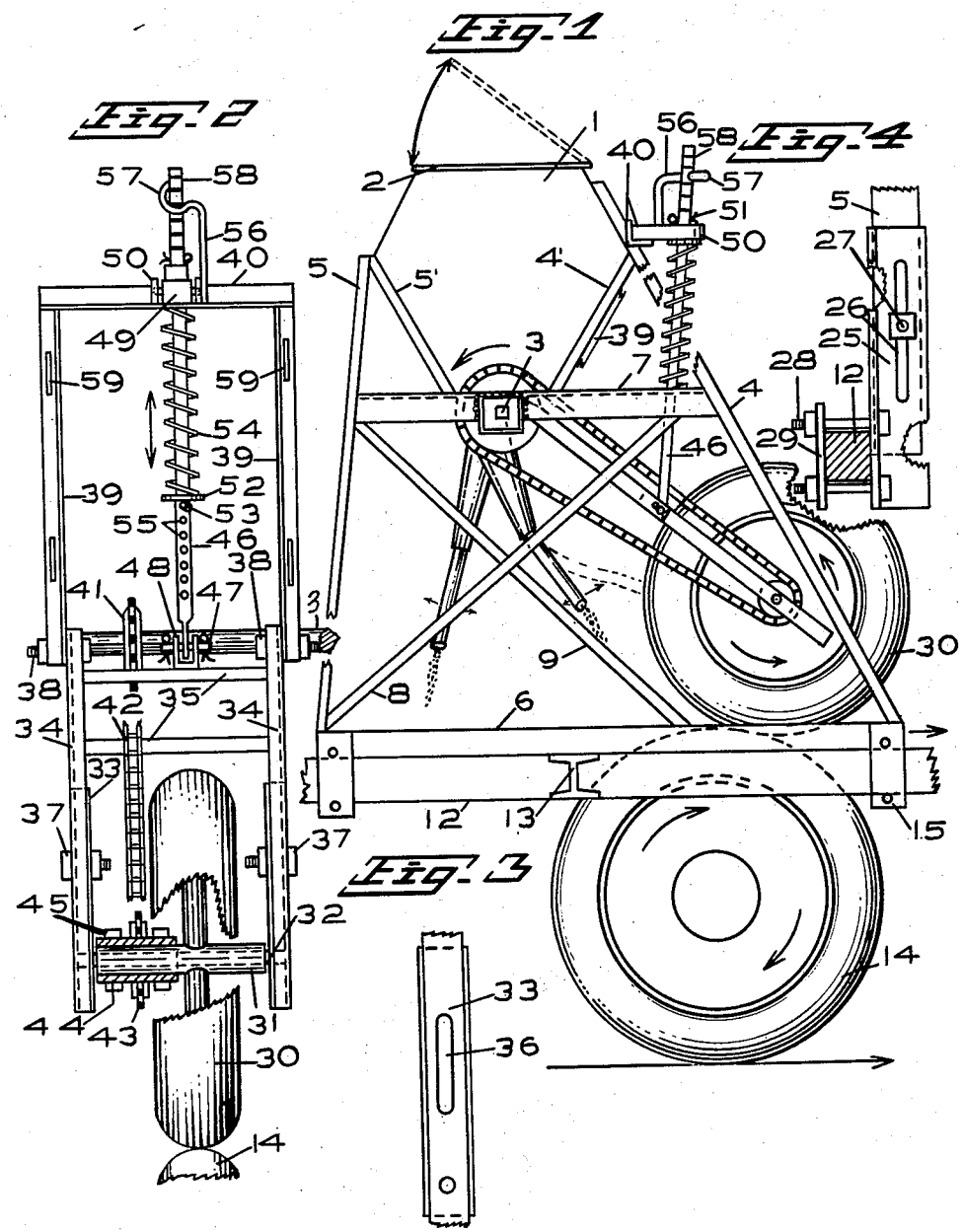

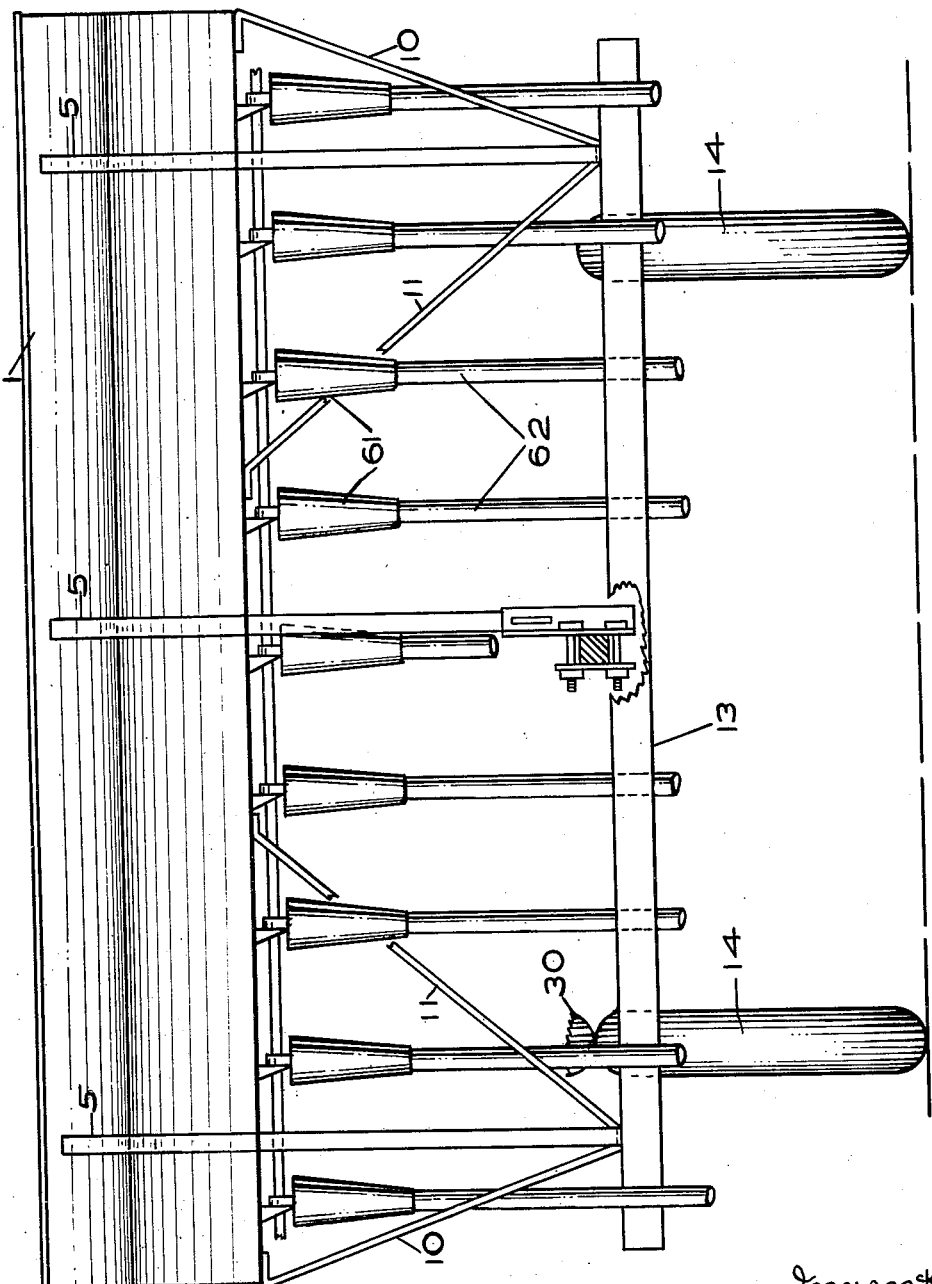

United States Patent Office 2,951,458
Patented Sept. 6, 1960

2,951,458

SEEDER BOX MOUNTING AND DRIVE CONNECTION FOR CULTIVATORS

Robert Edgar Wade and William Cecil Wade, both of Consort, Alberta, Canada

Filed Jan. 24, 1958, Ser. No. 711,027

3 Claims. (Cl. 111—52)

My invention relates to seeding attachments for soil cultivators, having reference to a seed box and mounting by which the seed box may be attached on a cultivator frame, and including driving means for a feed shaft in the seed box.

Soil cultivators more usually provide a wheel supported frame and soil working elements carried in the frame, and the present device is designed for converting such an implement for use as a seeder.

This seeding attachment provides a frame by which a seed box may be mounted on a cultivator of a character in common use, that is one providing a wheel supported frame on which cultivator feet are carried and the feet adapted to be moved in and out of working relation with the ground by raising or lowering the frame on its supporting wheels. The seeding attachment includes also a driving connection for a seed feed shaft in the seed box, which connection may be automatically made and broken by the raising or lowering of the cultivator frame in moving the cultivating feet in and out of working relation with the ground. The device further provides gauge means for determining the depth at which the cultivator feet are working.

In the drawings showing a preferred embodiment of the invention,

Fig. 1 is an end view of a seed box and frame for mounting the box on a cultivator frame with parts broken away, a cross bar of the latter being shown and a supporting wheel indicated.

Fig. 2 is a front view showing the mounting for the feed shaft driving connection, including a part of said shaft, shown broken away and sectioned in part.

Fig. 3 shows a side view of a fragment of a side bar for mounting the driving wheel of the feed shaft driving connection.

Fig. 4 shows a detail enlarged view of the center clamping connection for the seed box frame, shown broken away in part and including a cross section of a cultivator frame cross bar.

Fig. 5 is a rear view of the seed box and its frame for mounting the box on the cultivator, shown broken away and in part sectioned, the rear frame bar and supporting wheels of the cultivator being shown.

Having reference to the drawings 1 indicates a seed box of conventional design and which would include a cover 2 and seed feed shaft 3.

For mounting the seed box on a cultivator frame removable therefrom there is provided a seed box supporting frame. This consists of a series of front frame bars 4, back frame bars 5, lower frame connecting bars 6 and intermediate frame connecting bars 7, the connecting bars in each instance joining aligned front and rear frame bars. Additionally there are brace members 8 and 9 crosswise bracing the frame and further brace bars 10 and 11 bracing the frame lengthwise. The frame bars 4 and 5 unite to form a unitary structure with an integral cradle therebetween formed by depending portions 4' and 5' in which the seed box is seated.

This frame structure is to be mounted on the frame of a wheel supported cultivator, of which cross bars 12 and 13 are shown and supporting wheels 14, the latter preferably being rubber tired.

The attachment of the seeder frame to the cultivator side bars is by clamps 15 at the corners and center clamping attachments, the latter being shown in detail in Fig. 4 and consisting of angle plates 25 endwise adjustable on the center frame bars by provision of slots 26 in which attaching bolts 27 engage. For attachment of the angle plates to a cultivator frame bar 12 bolts 28 are used engaging a wing of the angle plates 25 and a clamping plate 29.

The driving connection for the seed shaft 3 may be mounted at either end of the cultivator and provides a friction driving connection with one of the cultivator wheels 14. For this a rubber tired wheel 30 is provided mounted on a hub 31, the hub having end axle shafts 32 rotatable in adjusting bearing plates 33, these plates mounting to slide endwise in channel bars 34 of a drive frame that includes upper and intermediate connecting bars 35 between the channel bars. The adjusting plates are provided with slots 36 engaged by bolts 37 by which the plates may be endwise adjusted in the channel bars 34.

The channel bars 34 carry bolts 38 to which are pivotally attached side bars 39, these side bars having a connecting cross bar 40 at their upper ends. The bars 39 are attachable to the seed box, for which slots 59 are provided to be engaged by bolts, the slots permitting adjustment to accomodate different sizes of feed boxes. For driving the shaft 3 a sprocket wheel 41 is used connected by a chain 42 to be driven by a sprocket wheel 43 on the hub 31 that is secured on the hub by a sleeve 44 attached by bolts 45.

The driven wheel 30 is held suspended above its driving cultivator wheel 14 when the cultivator feet are raised, but when the cultivator frame is lowered the wheel 30 is brought in contact with its cultivator driving wheel for frictional engagement therewith to drive the wheel 30. For suspension of the wheel 30 out of engagement with its driving wheel 14 when the cultivator frame is raised, a rod 46 is employed. This rod pivotally engages the upper of the bars 35 by a pin 47 carried in spaced ears 48. The rod 46 is slidable in a block 49 suspended to pivot between plates 50 on the upper frame bar 40, and is held limiting downward movement by a cotter pin 51. On the rod 46 is a collar 52 held by a pin 53 and between this collar and the cross bar 40 is a coiled spring 54 that would be tensioned when the wheel 30 is raised. This spring is adapted to hold the wheel 30 in constant contact with its drive wheel 14 when the cultivator frame is lowered to bring its cultivating feet in working relation to the ground, it being understood that in using the seeding attachment the feet would include seeding shoes. Adjustment of the spring tension is permitted by provision of extra bolt or pin openings 55.

There is also included a gauge by which the depth at which the seeding shoes on the cultivating feet are operating may be determined. This consists of a pointer 56 fixed to a lug 50 and having an indicating finger 57 in relation to which the rod 46 is slidable, the rod having a series of indicating markings 58.

In Figure 5 are shown the boots 61 for receiving seed from the seed box and tubes 62 that deliver the seed to the seed distributing shoes.

In the use of the device, in cultivating devices for which this seed box assembly is designed to be used the cultivator frame is raised or lowered on its wheels to move the cultivating feet in and out of working relation to the ground. When the cultivator frame is lowered, bringing its cultivating feet and seed distributing shoes into the ground, the wheel 30 moving down with the cultivator frame is brought into contact with its driving wheel 14 and is driven thereby when the cultivator moves ahead and drives the seed feed shaft 3 to feed seed to the seed distributing shoes. Contact of the wheel 30 with its drive wheel 14 is maintained by the spring 54. When the cultivator frame is raised it at the same time raises the wheel 30 breaking contact with its drive wheel 14 and the seeding stops.

The frame for the seed box and its drive attachment is attachable on any standard wheel supported cultivator, or may readily be adjusted to one. When not required the seed box and attachments may be removed and the cultivator restored to its regular cultivating uses.

The device also provides the gauge for determining the seeding depth, which is an important part of the seeding attachment.

Having thus particularly described and ascertained the nature of our said invention, what we claim and wish to secure by Letters Patent is:

1. A seeding attachment for mounting on a standard type of cultivator by which the cultivator may be converted for use as a seeder, said cultivator being of a character having a rectangular main frame and wheels supporting the frame, said frame being mounted to be raised and lowered on the wheels, said attachment comprising a series of frame bars and means detachably mounting the frame bars in pairs on opposite sides of the cultivator frame, the upper end portions of said bars depending inwardly with opposing bars in each pair combining to form a cradle, a seed box seated in the cradles formed by said bars, said seed box including a seed feed shaft, and means by which the seed feed shaft may be driven from a main frame supporting wheel, said means comprising a pair of side bars adapted to be attached vertically adjustable on the seed box, a connecting cross bar on the side bars, a frame pivotally suspended from the side bars, a rod pivotally engaging the pivotally suspended frame, means carried by said cross bar mounting the rod to be vertically slidable therein and including means limiting the downward movement of the rod, spring means urging said rod downward, a wheel mounted for rotation in the pivotally suspended frame adapted when the cultivator frame is lowered to be driven by a main frame supporting wheel, and means forming a driving connection from the wheel in the pivotally suspended frame to the seed feed shaft.

2. In an accessory seeding attachment for mounting on cultivators, said attachment including a seed box and a seed feed shaft for the box, and the cultivator including a main frame on which the seeding attachment is adapted to be mounted and wheels on which the main frame is supported to be raised and lowered, means for driving the seed feed shaft from a main frame supporting wheel, said means comprising side bars adapted for attachment on the seed feed box, a cross bar connecting said side bars, a frame pivotally suspended from the side bars, a wheel mounted for rotation in the pivotally suspended frame, means forming a driving connection from said wheel to the seed feed shaft, a rod pivotally engage the pivotally suspended frame, means carried by the cross bar mounting said rod to be vertically slidable therein, means limiting downward movement of the rod, and a coiled spring urging said rod downward and adapted thereby to hold the wheel mounted in the pivotally suspended frame frictionally engaged by the main frame supporting wheel when the main frame is lowered.

3. A device as defined in claim 2 in which the rod has indicating markings thereon, and an arm carried by the mounting for said rod, said arm having a finger aligned to register with said markings.

References Cited in the file of this patent
UNITED STATES PATENTS

| | | |
|---|---|---|
| 81,410 | Rodes | Aug. 25, 1868 |
| 875,539 | Little | Dec. 31, 1907 |
| 932,741 | Wylie | Aug. 31, 1909 |
| 1,918,172 | Barron et al. | July 11, 1933 |
| 2,023,053 | Kugel | Dec. 3, 1935 |
| 2,176,528 | Gilchrist | Oct. 17, 1939 |
| 2,812,732 | Melsdalen | Nov. 12, 1957 |